Dec. 30, 1924.

F. A. STEVENS 1,521,484

OPHTHALMIC MOUNTING

Filed May 8, 1920

2 Sheets-Sheet 1

Inventor:
Frederick A. Stevens.
By David Rines
Attorney:

Dec. 30, 1924.

F. A. STEVENS 1,521,484

OPHTHALMIC MOUNTING

Filed May 8, 1920  2 Sheets-Sheet 2

Inventor:
Frederick A. Stevens
By David Rines
Attorney:

Patented Dec. 30, 1924.

1,521,484

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 8, 1920. Serial No. 379,788.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings and more particularly to temple connections for spectacles.

The securing together of the temple end pieces of a pair of spectacles is a delicate operation which requires skilful manipulation. The ends of the rim must be held, one in each hand, and the lens must be prevented from falling out of the open rim, and yet some way must also be found for holding the temple in position about the dowel until the end pieces are brought together and the free end of the dowel has entered its registering opening provided upon the opposite end piece. In many instances, the temple falls off the dowel before the operation is completed, necessitating a repositioning of the various elements anew preparatory to another trial. Various attempts have hitherto been made to overcome this difficulty, most of which involve complications of structure, and none of which are entirely satisfactory.

The object of this invention, therefore, is to provide simple means for self-maintenance of the temple in position upon the dowel until the end pieces are secured together.

To this end, a feature of the invention contemplates providing the dowel with a projecting shoulder that is adapted to be engaged by the temple to maintain it in position upon the dowel. The shoulder may pass through the opening in the ear of the temple to permit removal of the temple from the dowel.

With the above object in view, the invention consists of the improved ophthalmic mounting hereinafter described, illustrated in the accompanying drawings and defined in the appended claims.

Figure 1:
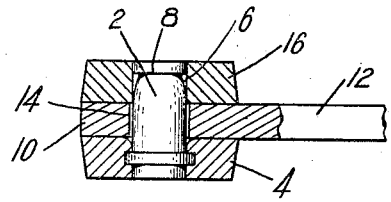
Figure 2:
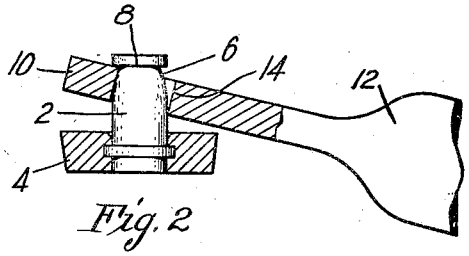
Figure 4:
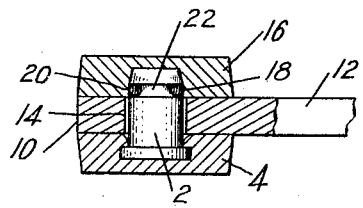
Figure 3:
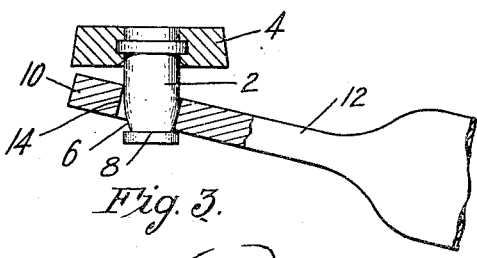
Figure 5:
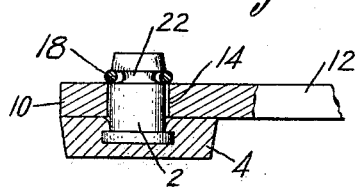
Figure 6:
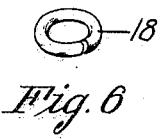
Figure 9:
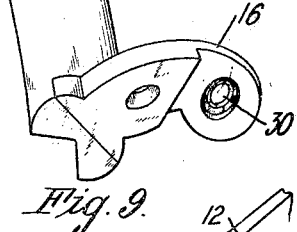
Figure 7:
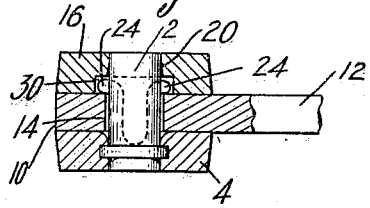
Figure 8:
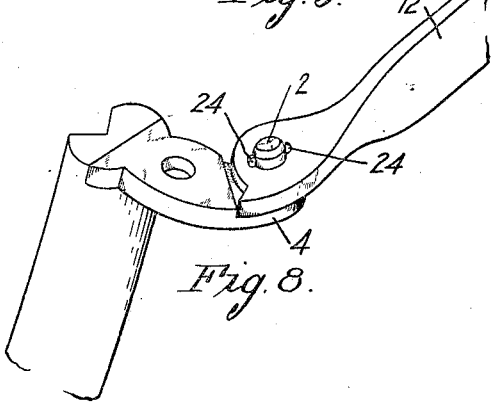
Figure 11:
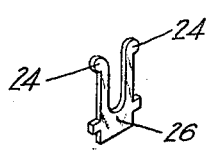
Figure 10:
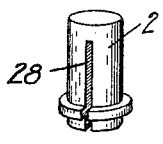
Figure 12:
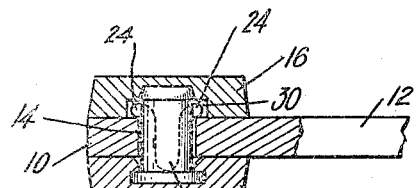
Figure 13:
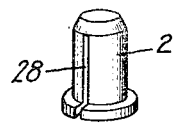
Figure 14:
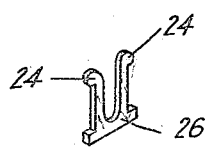
Figure 15:
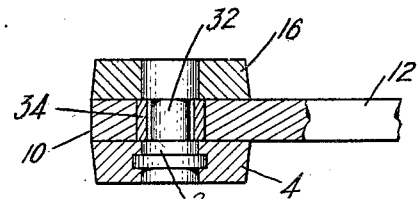
Figure 17:
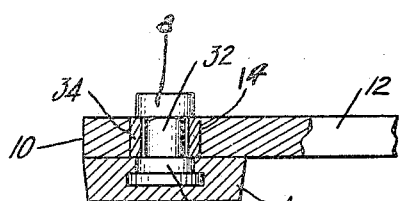
Figure 16:
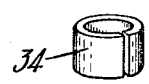
Figure 18:
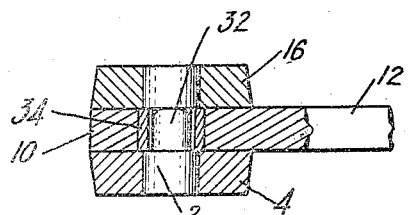

In the drawings, Fig. 1 is a view in cross section through the end pieces of a spectacle frame, showing a preferred embodiment of the present invention; Fig. 2 is a similar view, with one of the end pieces removed, showing a temple maintained in position upon a dowel; Fig. 3 is a similar view with the temple lowermost; Fig. 4 is a view similar to Fig. 1 of a modification; Fig. 5 is a view similar to Fig. 2 of the modification shown in Fig. 4; Fig. 6 is a view of a detail; Fig. 7 is a view similar to Fig. 1 of another modification; Fig. 8 is a perspective view of the modification shown in Fig. 7, showing a temple maintained in position upon the dowel; Fig. 9 is a perspective view showing the construction of the end piece that is unprovided with the dowel; Figs. 10 and 11 are views of details; Fig. 12 is a view similar to Fig. 7 of a slight modification; Figs. 13 and 14 are views corresponding to Figs. 10 and 11, respectively; Fig. 15 is a view of still another modification; Fig. 16 is a view of a detail; Fig. 17 is a view corresponding to Fig. 2 of a slightly modified embodiment; and Fig. 18 is a view similar to Fig. 15, illustrating a somewhat different method of mounting the dowel upon the end piece.

Referring to Figs. 1, 2 and 3, the body portion of a dowel 2, that is permanently secured upon a temple end piece 4 of a spectacle frame, is cylindrical to provide a bearing for a temple 12. The intermediate portion of the dowel is shown at 6 tapering towards the free end, or otherwise reduced in cross section, so as to provide a projecting, ring-shaped shoulder 8 at the free, unreduced end. The ear 10 of the temple 12 is provided with the usual opening 14 to facilitate its mounting upon the dowel. The diameter of the opening 14 is greater than that of the ring 8 to permit removal of the temple from the dowel. Upon the separation of the end piece 16 from the end piece 4, the temple will tend to tilt about the dowel and to fall off therefrom. The wall of the opening in the ear of the temple will, however, engage the shoulder 8, as shown in Fig. 2, whereby the fall will be checked and the temple will be maintained in position upon the dowel. So effective is the shoulder to maintain the temple upon the dowel that the spectacles may be held in any desired position without dislodging the temple. In Fig. 3, the end piece is shown inverted, with the free end of the dowel pointing downward, and with the temple nevertheless prevented from falling off. The temple may be intentionally removed from the dowel by merely lifting it off, the shoulder 8 passing through the opening 14.

The diameter of the opening 14 is sufficiently greater than that of the body portion of the dowel 2 to prevent the temple binding upon the dowel. Such binding is objectionable as interfering with the smoothness and uniformity of pivotal movement of the temple. The temple is perfectly freely mounted upon the dowel, may be removed and replaced with ease, and yet can not fall off at a time when it is desired to maintain it in position upon the end piece, and when it is not feasible to devote special attention to maintaining it there manually.

The ring-shaped projection 8 need not be integral with the body portion of the dowel. In the modification of Figs. 4, 5, and 6 it is shown separable at 18. For convenience of mounting within the dowel-receiving opening 20 of an ordinary standard end piece 16, the ring-shaped projection 18 is constituted of spring metal expansible, as shown in Figs. 5 and 6, to retain the temple in position upon the dowel, and contractible, as shown in Fig. 4, so as to be enclosed within the dowel-receiving opening 20 of standard size. To permit of this contraction, and so that the ring may be prevented from falling off the dowel, it is shown mounted within a groove 22 provided near the free end of the dowel.

Here, again, the temple is perfectly free to pivot about the dowel, without frictional binding thereagainst. It may readily be removed from the dowel by removing the ring 18 or by compressing the ring within the groove 22, but can not fall off accidentally, though the spectacles be held in any desired position, illustrated in Fig. 3. There is the added advantage that less opportunity is provided for wabbling of the temple upon the dowel than is the case with the construction of Figs. 1, 2 and 3.

The shoulder 8 of Fig. 1 need not extend all the way around the dowel. This will be understood from a consideration of Fig. 7, in which the shoulder is shown as consisting of a short, projecting finger 24. It is preferred to have this finger constituted of spring metal mounted upon a spring-metal base 26, as is illustrated in Fig. 11. The base 26 is mounted in a longitudinal slot 28 of the dowel. The illustrated embodiment of this modification is shown as comprising two oppositely disposed spring fingers 24, so that the temple ear may be engaged by one or the other of the fingers to correspond to the action illustrated in Figs. 2 and 3. In practice, to prevent wabbly motion, as in the case of Fig. 5, both fingers may be always in engagement with the temple ear, as will be clear from Figs. 7 and 8. The fingers 24 may be pressed inwardly into the slot 28 if an end piece 16 of standard construction is employed or, preferably, the opening 20 of the end piece 16 may be slightly enlarged at 30 to provide for receiving the projecting fingers without compressing them inwardly.

The invention is equally applicable to dowels mounted as in Fig. 1 or as in Fig. 4, as will be evident from a comparison of Fig. 12 with Fig. 7 and Figs. 13 and 14 with Figs. 10 and 11.

The structure of this modification is a little more complicated than that of Fig. 4, but, on the other hand, it has all the advantages of the latter-named modification with the additional advantage that the temple may be engaged at two points only by the fingers 24 and not throughout a complete circumference, as is the case with the ring 18.

In the modification of Fig. 15, the lack of wabbly motion of the temple upon the dowel that is attendant upon the structures of Figs. 4 and 7 is obtained with an integral projecting ring, as in Fig. 1. The body portion of the dowel is intermediately reduced in cross section at 32 and a spring collar 34 is loosely mounted about the reduced portion. The integral projecting ring-shaped shoulder 8 prevents the collar becoming detached from the dowel. After the spring collar 34 has been thus positioned, it is contracted and introduced within the opening 14 of the temple ear. The walls of the opening 14 becoming frictionally engaged by the collar, the collar and the temple act functionally as a unit. The temple is thus prevented from falling off the dowel, though, as in the other described modifications, the spectacles may be held in any position, yet it is freely pivotally mounted thereover without frictional binding thereagainst, and it may be readily removed and replaced as occasion demands.

Many other modifications will occur to those skilled in the art.

As the invention is believed to be broad in scope, it is intended that the following claims shall be broadly construed except in so far as limitations may therein be specifically imposed.

What is claimed as new is:

1. A temple end piece having a permanently secured dowel provided with a projecting shoulder adapted to be engaged by the ear of a removable temple to maintain the temple in position upon the dowel.

2. A temple end piece having a permanently secured dowel the free end of which is provided with a projecting ring adapted to be engaged by the ear of a removable temple to maintain the temple in position upon the dowel.

3. A temple end piece having a permanently secured dowel the body portion of which is reduced in cross section, whereby the free end of the dowel is provided with a projecting shoulder adapted to be engaged by the ear of a removable temple that is mounted upon the body portion to maintain the temple in position upon the dowel.

4. A temple end piece having a dowel the body portion of which tapers towards the free end thereof, the free end being provided with a projecting, integrally formed ring adapted to be engaged by the ear of a temple that is mounted upon the body portion to maintain the temple in position upon the dowel.

5. In combination, a temple end piece, a dowel secured to the end piece provided with a projecting shoulder, and a temple having an ear provided with an opening within which the dowel is received, the wall of the opening being adapted to engage the shoulder to cause the temple to be maintained in position upon the dowel, and the shoulder being adapted to be passed through the opening to permit removal of the temple from the dowel.

6. In combination, a temple end piece, a dowel permanently secured to the end piece, the free end of the dowel being provided with a projecting ring, and a temple having an ear provided with an opening within which the dowel is received, the wall of the opening being adapted to engage the ring to cause the temple to be maintained in position upon the dowel, and the diameter of the opening being greater than the diameter of the ring to permit removal of the temple from the dowel.

7. In combination, a temple end piece having a dowel, and a temple having an ear provided with an opening within which the dowel is received, the body portion of the dowel being cylindrical to provide a bearing for the temple, the free end of the dowel being provided with a projecting, integrally formed ring of diameter less than the diameter of the opening, and the intermediate portion of the dowel being reduced in cross section, the wall of the opening being adapted to engage the ring to cause the temple to be maintained in position upon the dowel.

8. A temple end piece having a permanently secured dowel that is integrally provided with means for maintaining a removable temple in position thereon.

9. In combination, a temple end piece, a dowel secured to the end piece, and a temple having an ear provided with an opening within which the dowel is received and the wall of which the dowel is adapted to engage without binding, the dowel being provided with means adapted to be engaged by the wall of the opening to cause the temple to be maintained in position upon the dowel, and the said means being adapted to be passed through the opening to permit removal of the temple from the dowel.

In testimony whereof, I have hereunto subscribed my name this 6th day of May, 1920.

FREDERICK A. STEVENS.